US008694756B2

(12) United States Patent
Li et al.

(10) Patent No.: US 8,694,756 B2
(45) Date of Patent: Apr. 8, 2014

(54) STARTING OTHER PROCESSING ELEMENTS (OPES) RESPONSIVE TO A DETERMINATION THAT CURRENTLY-RUNNING OPES ARE INADEQUATE TO INVOKE A LIBRARY FOR A MULTI-LIBRARY APPLICATION

(75) Inventors: Hui Li, Beijing (CN); Hong Bo Peng, Beijing (CN); Bai Ling Wang, Weihai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/452,129

(22) Filed: Apr. 20, 2012

(65) Prior Publication Data

US 2012/0204003 A1 Aug. 9, 2012

Related U.S. Application Data

(63) Continuation of application No. 12/549,505, filed on Aug. 28, 2009, now abandoned.

(30) Foreign Application Priority Data

Aug. 28, 2008 (CN) .......................... 2008 1 0214486

(51) Int. Cl.
*G06F 15/76* (2006.01)
(52) U.S. Cl.
USPC ........................................... 712/30; 718/102
(58) Field of Classification Search
None
See application file for complete search history.

(56) References Cited

U.S. PATENT DOCUMENTS

| 5,257,372 A | 10/1993 | Furtney et al. |
| 5,349,682 A | 9/1994 | Rosenberry |
| 7,418,703 B2 | 8/2008 | Edahiro et al. |
| 2003/0115495 A1 | 6/2003 | Rawson, III |

FOREIGN PATENT DOCUMENTS

| CN | 1549964 A | 11/2004 |
| EP | 0491342 A2 | 6/1992 |

OTHER PUBLICATIONS

China Office Action dated Apr. 18, 2012, English translation, Application No. 200810214486.3, 8 pages.

(Continued)

*Primary Examiner* — Andrew Caldwell
*Assistant Examiner* — Benjamin Geib
(74) *Attorney, Agent, or Firm* — Francis Lammes; Stephen J. Walder, Jr.; Diana R. Gerhardt

(57) ABSTRACT

A mechanism is provided for invoking multi-library application on a multiple processor system, wherein the multiple processor system comprises a Power Processing Element (PPE) and a plurality of Synergistic Processing Element (SPE). Applications including multi-libraries run in the memory of the PPEs. The mechanism comprises maintaining the status of each SPE in the applications running on the PPE, where there are SPE agents for capturing the instructions from the PPE in the SPEs that have been started. In response to a request for invoking a library, the PPE determines whether the number of available SPEs for invoking the library is adequate based on the current status of SPEs. If the number of available SPEs is adequate, the PPE sends a run instruction to selected SPEs. After finishing the invocation of all libraries, the PPE sends termination instructions to all started SPEs.

19 Claims, 5 Drawing Sheets

(56) References Cited

OTHER PUBLICATIONS

China Office Action dated Apr. 18, 2012, Application No. 200810214486.3, 6 pages.
USPTO U.S. Appl. No. 12/549,505.
Alind, Markus et al., "BlockLib: A Skeleton Library for Cell Broadband Engine", IWMSE '08, http://portal.acm.org/citation.cfm?doid=1370082.1370088, May 11, 2008, pp. 7-14.
Chen, Thomas et al., "Cell Broadband Engine Architecture and its first implementation", http://www.ibm.com/developerworks/power/library/pa-cellperf/, Nov. 29, 2005, 16 pages.
Gschwind, Michael, "The Cell Broadband Engine: Exploiting Multiple Levels of Parallelism in a Chip Multiprocessor", IBM Corporation, IBM Research report, RC24128 (WO610-005), http://domino.research.ibm.com/library/cyberdig.nsf/papers/1B2480A9DBF5B95 38525723D0051A8C1/$File/rc24128.pdf, Oct. 2, 2006, pp. 1-18.
Jimenez-Gonzalez, Daniel et al., "performance Analysis of Cell Broadband Engine for High Memory Bandwidth Applications", IEEE International Symposium on Performance Analysis of Systems & Software (ISPASS 2007), http://ieeexplore.ieee.org/Xplore/login.jsp?url=/iel5/4211006/4211007/04211037.pdf?isnumber=4211007&prod=DNF&arnumber=4211037&arSt=210&ared=219&arAuthor=, Apr. 25-27, 2007, pp. 210-219.
Kim, Hahan et al., "PVTOL: A High-Level Signal Processing Library for Multicore Processors", HPEC 2007, www.II.mit.edu/HPEC/agendas/proc07/Day3/05__Kim__Abstract.pdf, Sep. 18-20, 2007, 2 pages.
Kumar, Arun et al., "A Buffered-Mode MPI Implementation for the Cell BE Processor", ICCS 2007, www.cs.fsu.edu/~asriniva/papers/ICCS07.pdf, May 27-30, 2007, 8 pages.
Meredith, Jeremy S. et al., "Programming the Cell Processor: Achieving High Performance and Efficiency", www.csm.ornl.gov/SC2007/pres/Meredtih__Cell__Judy/Meredith__Cell__SC07.pdf, 2007, 11 pages.
Notice of Non-Complaint Amendment mailed Nov. 29, 2012, for U.S. Appl. No. 12/549,505; 4 pages.
Office Action mailed Nov. 8, 2012 for U.S. Appl. No. 12/549,505; 34 pages.
Response to Notice of Non-Complaint Amendment and Substiute Preliminary Amendment filed Sep. 17, 2012, U.S. Appl. No. 12/549,505, 8 pages.
Express Abandonment filed Jul. 23, 2013, U.S. Appl. No. 12/549,505, 1 page.
Final Office Action mailed Apr. 9, 2013 for U.S. Appl. No. 12/549,505; 25 pages.
Interview Summary dated Feb. 1, 2013, U.S. Appl. No. 12/549,505, 31 pages.
Responce of Office Action filed Feb. 8, 2013, U.S. Appl. No. 12/549,505, 30 pages.

STARTING OTHER PROCESSING ELEMENTS (OPES) RESPONSIVE TO A DETERMINATION THAT CURRENTLY-RUNNING OPES ARE INADEQUATE TO INVOKE A LIBRARY FOR A MULTI-LIBRARY APPLICATION

BACKGROUND

The present invention generally relates to computer software technology and particularly to invoking multi-library applications on a multiple processor system.

A multiple processor system (MPS) may comprise a Power Processing Element (PPE) and a plurality of Synergistic Processing Elements (SPEs). The PPE and the plurality of SPEs share the main memory and each SPE has its own memory. IBM's Cell Broadband Engine (CBE) is one kind of MPS.

IBM's CBE is a MPS on a single chip, as shown in FIG. 1, having 9 processing units that share the same main memory, in which one is a (PPE) and the other eight are (SPEs). Based on such system architecture, the CBE can provide terrific system capabilities and CBE overcomes the three important performance limitations that are on other MPSs, i.e., power usage, memory usage and processor frequency. Therefore, the CBE has been widely used in signal processing, pattern matching, model building, object determining, mapping, communication, and encryption, etc. CBE has taken a leading position, especially in High Performance Computing. For high performance computing or other computation sensitive applications, more and more libraries have been rewritten to be suitable for running on CBE. However, the running efficiency and development efficiency that multiple libraries run on a single CBE is becoming an obvious problem.

Each computation sensitive application running on CBE mainly depends on an SPE to execute computing. Before an SPE begins to compute, the SPE will create a system thread and an SPE thread, and then destroy these threads after the SPE finishes computing. For invoking a multi-library application, thread creation and destruction has to be completed when invoking the first library; and the same applies when invoking the second and following libraries. Thread creation and destruction needs time. For huge computing tasks, the time for thread creation and destruction may not be significant. However, for small and computation sensitive applications that invoke dense libraries, such creation and destruction will consume a lot of time, which lowers the efficiency of the whole system and tasks.

SUMMARY

In one illustrative embodiment, a mechanism is provided for invoking a multi-library application on a multiple processor system. In the illustrative embodiment, the multiple processor system comprises a Power Processing Element (PPE) and a plurality of Synergistic Processing Elements (SPEs), in a single chip. In the illustrative embodiment, the multi-library application including multi-libraries that run in memory on the PPE. The illustrative embodiment maintains a status of each of the plurality of SPEs in the multi-library application running on the PPE. In the illustrative embodiment, there are SPE agents for capturing instructions from the PPE in each of the plurality of SPEs that have been started. In response to a request for invoking a library in the multi-library application, the illustrative embodiment determines whether a number of available SPEs of the plurality of SPEs for invoking the library is adequate based on a current status of each of the SPEs in the plurality of SPEs. Responsive to the number of available SPEs being adequate, the illustrative embodiment sends a run instruction to selected SPEs. After finishing an invocation of all libraries, the illustrative embodiment sends termination instructions to all of the selected SPEs.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Preferred embodiments of the present invention will now be described more fully hereinafter in more detail with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
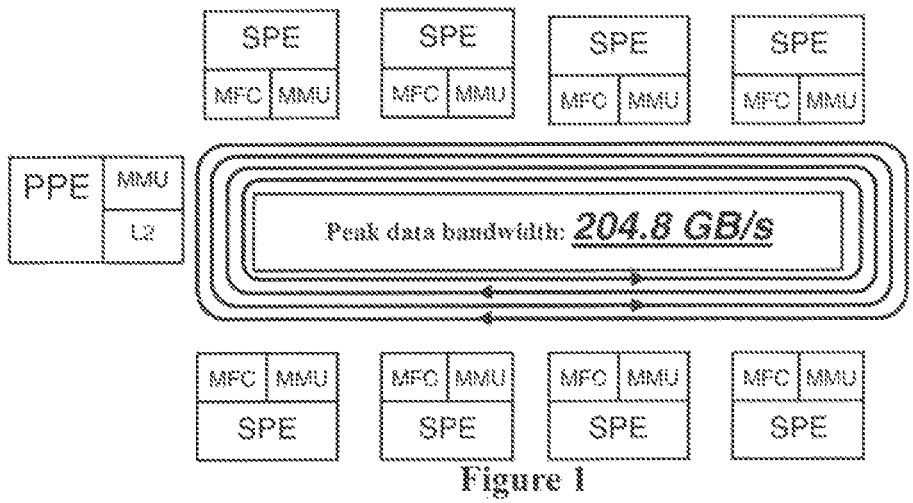
FIG. 1 shows the exemplary system diagram of CBE.
Figure 2:
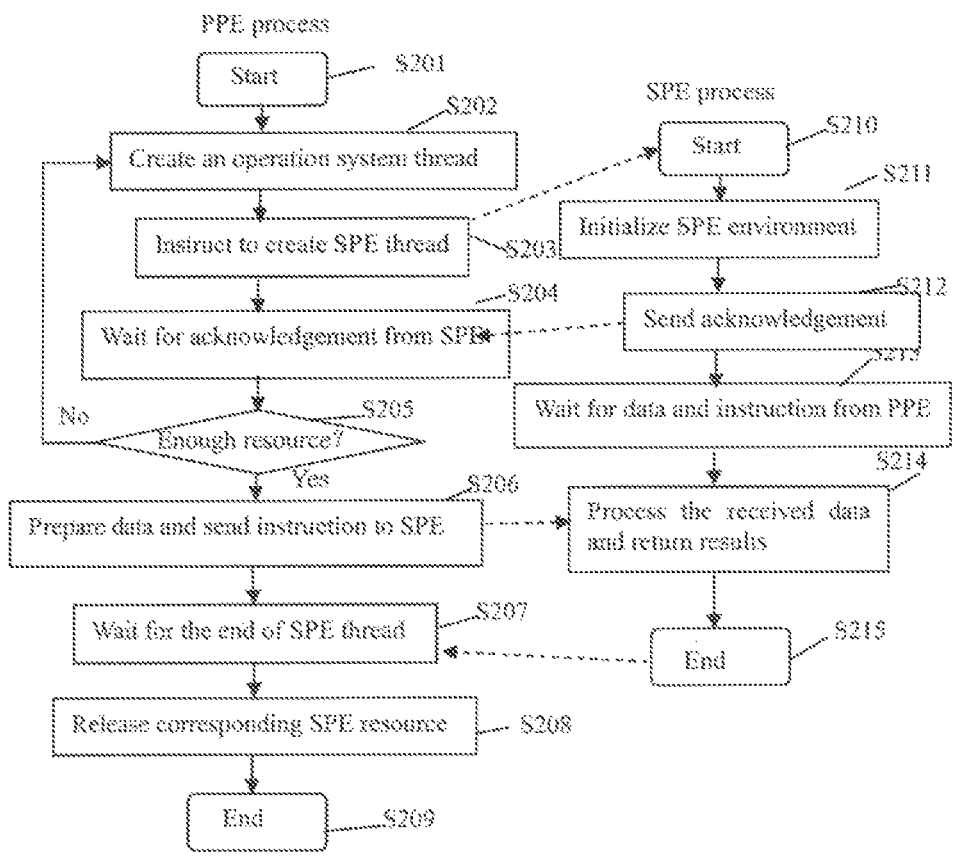
FIG. 2 shows the PPE and SPE process when invoking a library in CBE system in accordance with an illustrative embodiment.

Referring to FIG. 2, in which the Power Processing Element (PPE) and Synergistic Processing Elements (SPE) process for invoking a library in Cell Broadband Engine (CBE) system is shown in accordance with an illustrative embodiment. The following steps are in the PPE process. In step S201, the PPE starts to invoke the SPE process; in step S202, the PPE creates an operation system thread, and then sends the instruction of creating an SPE thread to an SPE in step S203. After sending the instruction, the PPE waits for an acknowledgement from the SPE in step S204. After the SPE sends an acknowledgement, the PPE receives the acknowledgement and determines whether the resource is adequate in step S205. If the resource is not adequate, the PPE returns to step S202, in which the creation of the operating system thread is continued. If the resource is adequate, the PPE enters step S206, in which data are prepared and an instruction is sent to the SPE. In step S207, the PPE waits for the termination of the SPE thread. Once the SPE thread ends, the PPE releases the corresponding SPE resource, and then in step S209, the process ends.

FIG. 2 also shows the corresponding SPE process. In response to the PPE request, the SPE is started in step S210. The SPE initializes its environment in step S211. In response to the step S204 in the PPE, the SPE sends the acknowledgement to confirm that the initialization has ended. In step S213, the SPE waits for data and the instruction from the PPE and then in response to the step S206 in the PPE, the SPE processes the received data and returns results in step S214. The SPE process ends in step S215.

From FIG. 2, those skilled in the art know that once the PPE invokes a library, the PPE needs to create an operating system thread and instruction to create an SPE thread, and needs to release this kind of resource after invoking.

Figure 3:
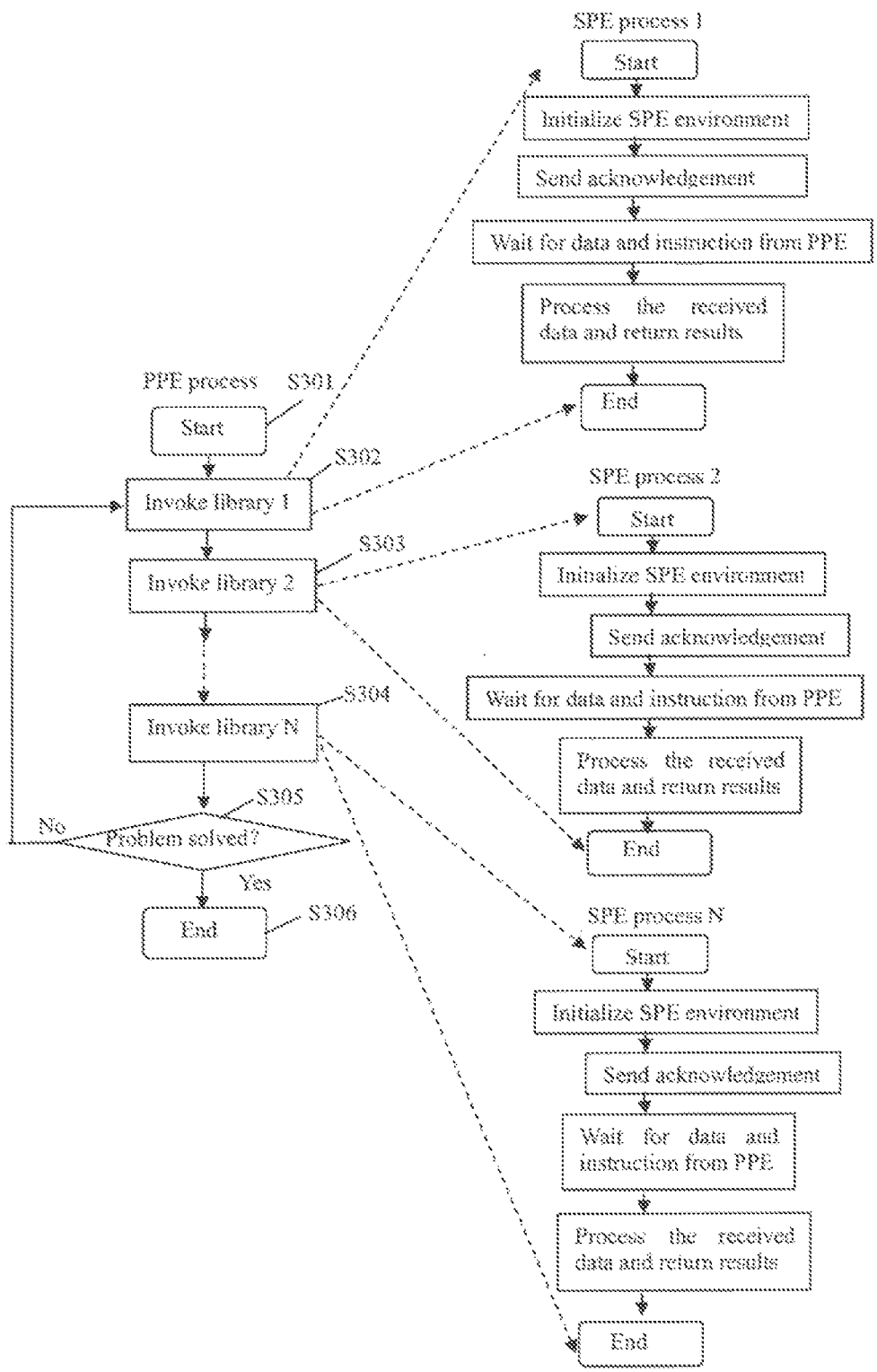
FIG. 3 shows the PPE and SPE process when invoking multi-library in CBE system in accordance with an illustrative embodiment.

Now referring to FIG. 3, in which the PPE and SPE processes for invoking a multi-library application in a CBE system is shown in accordance with an illustrative embodiment. In FIG. 3, the PPE starts its process in step S301. The PPE will invoke a multi-library application, here we suppose that N libraries will be invoked. In step S302, library 1 is invoked. The SPE process is the same as the SPE process shown in FIG. 2. And in step S303, library 2 is invoked, . . . , and in step S304, library N is invoked. The PPE process in each library invocation is the same as the PPE process in FIG. 2, and the SPE process in each library invocation is the same as the SPE process in FIG. 2. In step S305, the PPE determines whether the problem has been solved, i.e. whether all libraries that should be invoked have been invoked. If yes, the PPE enters step S306, in which the PPE process ends. Otherwise, the PPE continues to invoke libraries, here, library 1 is shown as an example. Comparing FIG. 3 with FIG. 2, one of ordinary skill in the art would understand that for every library invocation, the step of creating operating system thread (S202) and the step of instructing to create SPE thread (S203) are repeated from the PPE perspective. And the step of initializing the SPE environment and step of destroying the SPE thread are repeated from the SPE perspective. All these processes and the communication established between PPE/SPE consume a lot of time. Although the time may not be significant for huge computing tasks, the required time may not be ignored for those small and computation sensitive applications. The processes of frequently creating and destroying threads consume a lot of time and lower the efficiency of the whole system and tasks.

The core idea of the illustrative embodiments is that, when invoking a multi-library application, the processes of creating and destroying threads are cancelled. The created thread is kept until all the libraries are invoked and instructed by the PPE to terminate. With the illustrative embodiments, the process of frequently creating and destroying threads may be avoided, thus the efficiency of the whole system and tasks may be improved.

Figure 4:
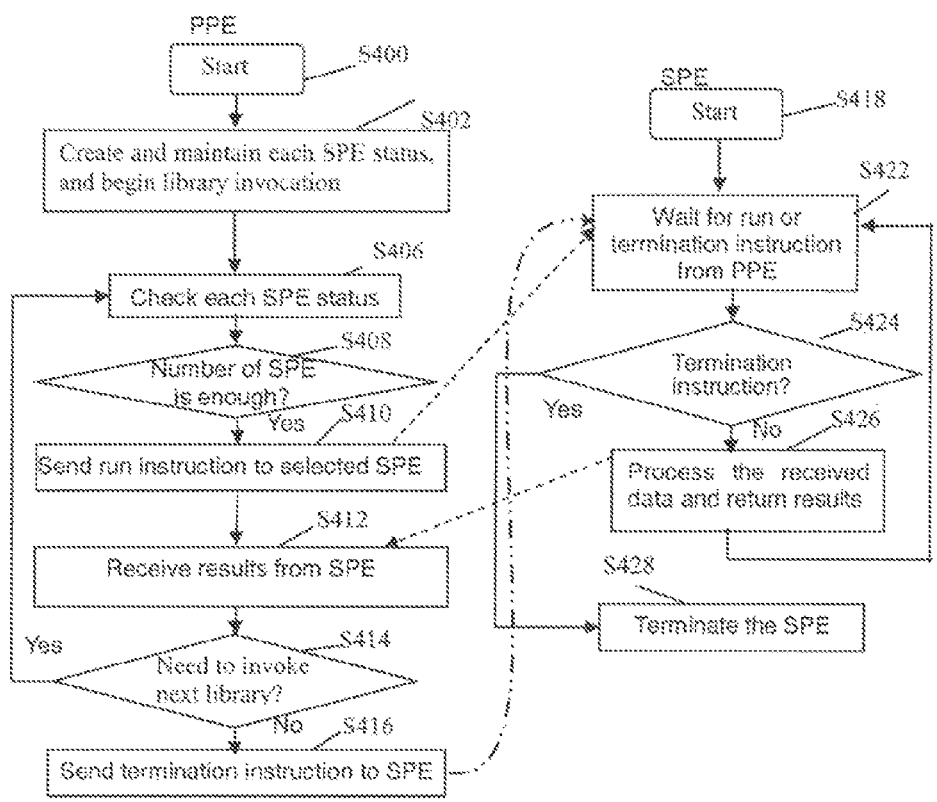
FIG. 4 shows the PPE and SPE process when invoking multi-library in CBE system in accordance with an illustrative embodiment.

FIG. 4 shows the PPE and SPE process for invoking a multi-library in a CBE system in accordance with an illustrative embodiment. The process presents a method for invoking multi-library applications on a multiple processor system, wherein the multiple processor system comprises a Power Processing Element (PPE) and a plurality of Synergistic Processing Element (SPE). Applications including multiple libraries run in the memory of the PPE. In step S400, the PPE process starts and then in step S402, status of each SPE are maintained in the application running on the PPE, wherein there are SPE agents in the SPEs that have been started, for capturing the instructions from the PPE. The function of SPE agents will be described in detail later. In step S406, the PPE checks the status of each SPE. In step S408, the PPE determines, based on the current status of each SPE, whether the number of available SPEs is adequate for invoking the library. If the number of available SPEs is adequate, the PPE sends a run instruction to selected SPEs in Step S410. In step S412, the PPE receives results that SPE has processed. Then in step S414, the PPE checks whether there is a need to invoke the next library. The PPE will not send the termination instruction to all started SPEs until all libraries have been invoked, as shown in step S416. Each SPE corresponding process is: the SPE waits for a run instruction or a termination instruction from the PPE in step S422, and the PPE determines the type of instruction in step S424. If the instruction is not a termination instruction, the SPE processes according to the run instruction in step S426, i.e., processing data and returning results. If the instruction is a termination instruction, the SPE terminates itself in step S428.

Thus, in this illustrative embodiment, the PPE determines how many SPEs may support current library invocation by maintaining the status of each SPE. Only when the number of the current SPEs that are in IDLE status is not adequate, the SPEs that have not been started will be started, such that the SPEs do not need to be created and destroyed frequently.

Figure 5:
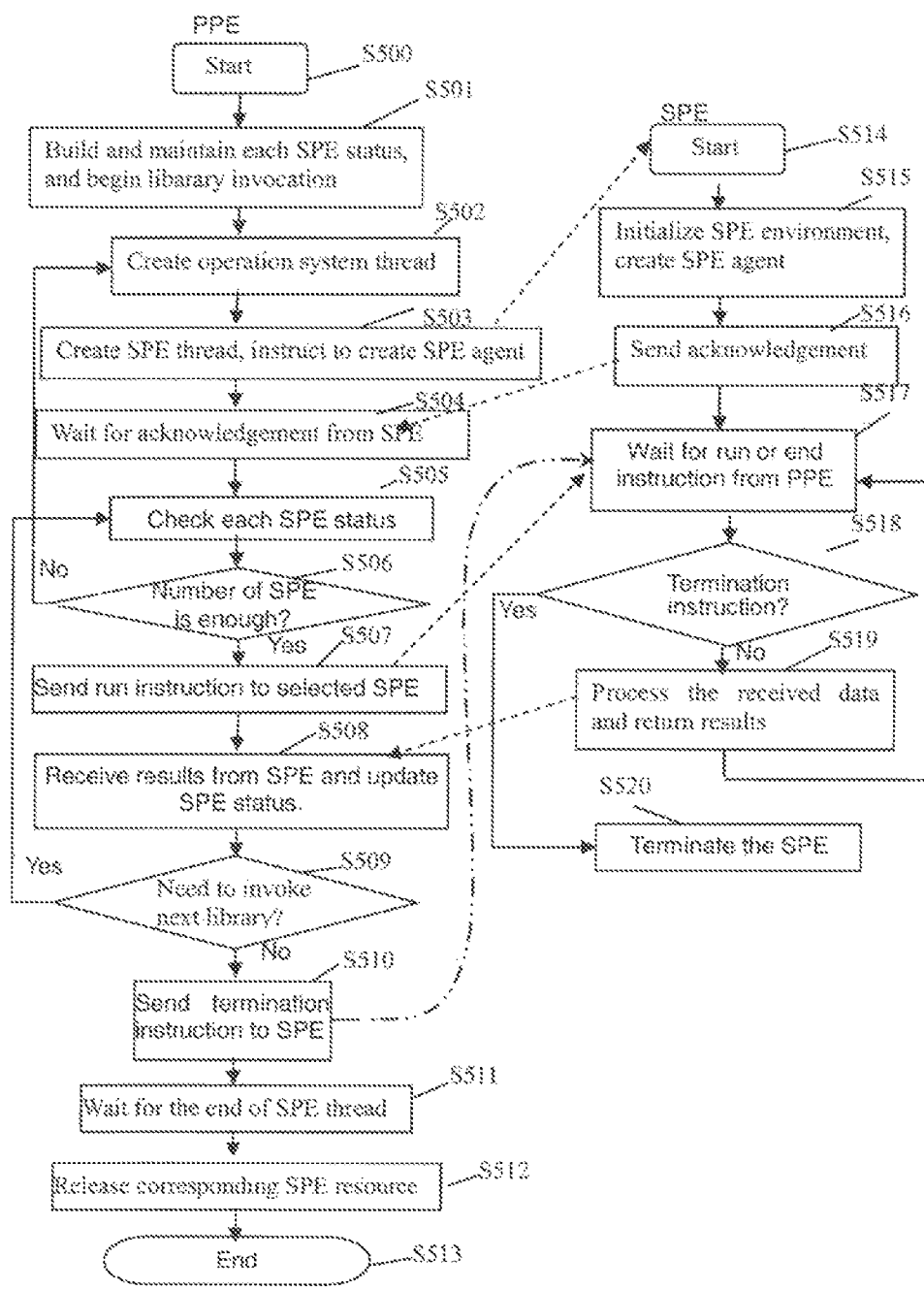
FIG. 5 shows the PPE and SPE detailed process when invoking multi-library in CBE system in accordance with an illustrative embodiment.

Turning to FIG. 5, in which the PPE and SPE process for invoking multi-library applications in a CBE system in accordance with an illustrative embodiment, is shown in detail. In step S500, the PPE process starts. And in step S501, the PPE establishes and maintains the status of each SPE. The status of each SPE includes BUSY, IDLE, and NOT STARTED, where the NOT STARTED status denotes that the SPE has not been started; the BUSY status denotes that the SPE has been started and is executing tasks; and the IDLE status denotes that the SPE has been started and is not executing tasks. The status of each SPE may be stored in cache or memory, and may be updated according to the status change of each SPE so that the latest status could be maintained. When the library begins to be invoked, in step S502, the PPE creates an operation system thread first, and then sends out an instruction to an SPE to create an SPE thread. The SPE agent that receives the instruction from the PPE determines the type of instruction. Then the PPE waits for an acknowledgement from the SPE to confirm that above operations have been done in step S504. After receiving the acknowledgement, the PPE checks the status of each SPE in step S505 and determines whether the number of available SPEs is adequate for invoking the library in step S506. In the determination process, the number of required SPEs for invoking the current library is determined first based on current SPE status; and then the number of SPEs in IDLE status is determined; if the number of SPEs that are in IDLE status is more than the number of required SPEs for invoking the current library, then the number of available SPEs for invoking the library is adequate. If the number of available SPEs for invoking the library is adequate, the PPE sends the task of invoking the library to selected SPEs. That is, the SPEs that are in IDLE status. There may be a plurality of current SPEs that are in IDLE status, and there may be many methods to select SPEs, for example, to select SPEs randomly, or according to SPE sequence number, or any other methods known to those skilled in the art. After selection, the PPE sends the run instruction to the selected SPEs in step S507, and then updates the SPE status as BUSY. When the PPE receives the result from the SPEs, the PPE updates the SPE status as IDLE in step S508. Then the PPE determines whether there is a need to invoke the next library in step S509. If needed, the PPE process returns to step s505. If the number of available SPEs for invoking the library is not adequate, more SPEs need to be started. In more detailed description, the PPE process returns to Step S502 from Step S506, in which another SPE is started. If all SPEs have been started, the process has to wait in step S506. If all the libraries have been invoked, the PPE sends a termination instruction, in step S510, to all SPEs started, and waits for the termination of all SPE threads in step S511. After all SPE threads are terminated, the PPE releases the resource of each SPE in step S512. Then the PPE process ends in step S513.

Referring to FIG. 5 again, a responding SPE process is also shown, in which an SPE is started in Step S514. In step S515, in response to the PPE request, the SPE initializes its environment and creates an SPE agent to capture the PPE instruction and determine the type of instruction. Then the SPE sends an acknowledgement that the SPE initialization process has ended in step S516. When the SPE agent begins to run in step S517, the SPE agent will capture a run instruction or termination instruction. In the existing technology, there is no such kind of agent, so the SPE termination is not controlled by the PPE. That is, after the SPE finishes its task, the SPE will be terminated and the PPE is notified automatically. In the illustrative embodiments, the objective is to control the SPE by the PPE by creating such SPE agent in the SPE. The SPE agent, for capturing the instructions from the PPE, executes the following steps: receiving an instruction from the PPE; determining whether the instruction is a termination instruction or a run instruction; if the instruction is a termination instruction, terminating the SPE; if the instruction is a run instruction, instructing the SPE to execute the instruction. That is, to process the received data and send the result back in response to the PPE request.

Figure 6:
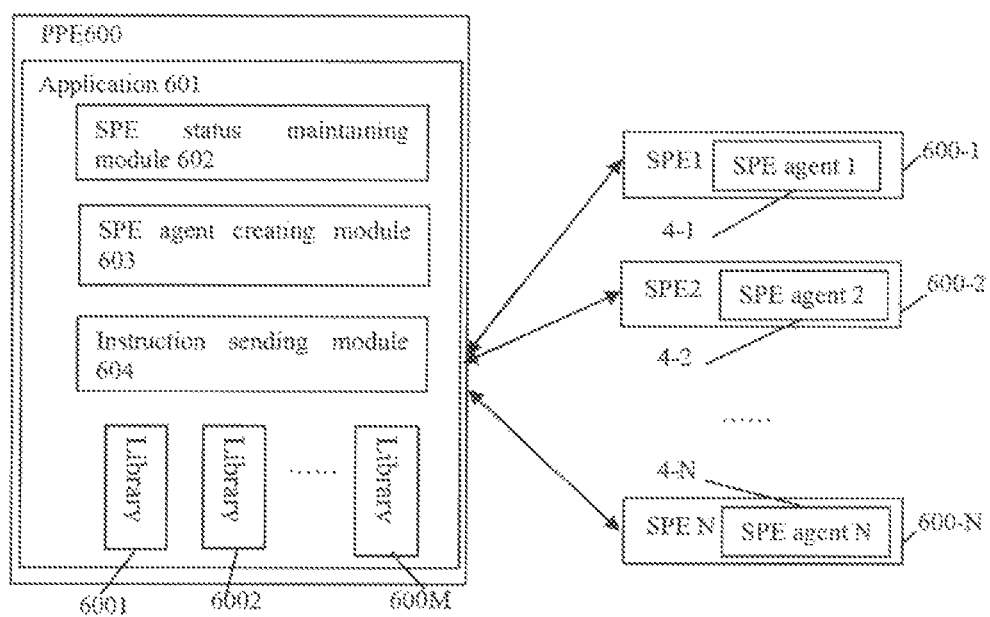
FIG. 6 shows a system for invoking multi-library in accordance with an illustrative embodiment.

Based on the same illustrative embodiment concept, there is provided a system for invoking multi-library applications on a multiple processor system. Referring to FIG. 6, a system for invoking multi-library applications is shown in accordance with an illustrative embodiment. The system for invoking multi-library applications on a multiple processor system comprises a Power Processing Element (PPE) and a plurality of Synergistic Processing Element (SPE), e.g. 600-1, 600-2, . . . , 600-N. Application 601 includes multi-libraries (M libraries) running in the memory of the PPE. The M libraries are shown as 6001, 6002, . . . , 600M in FIG. 6. The PPE also comprises SPE status maintaining module 602, for maintaining the status of each SPE in the application of PPE; SPE agent creating module 603, for creating an SPE agent for capturing instructions from the PPE; and instruction sending module 604, in response to a request for invoking a library, for determining whether the number of available SPEs for invoking the library is adequate based on the current status of each SPE. If the number of available SPEs is adequate, the PPE sends a run instruction to selected SPEs. After finishing the invocation of all libraries, the PPE sends a termination instruction to all SPEs started, wherein the SPEs started comprise the SPE agents for capturing the instructions from the PPE.

When the SPEs are instructed to start by the PPE, the SPE status maintaining module 602 in the PPE creates and maintains the status of each SPE. The SPE status includes BUSY, IDLE, and NOT STARTED, wherein the NOT STARTED status denotes that the SPE has not been started; the BUSY status denotes that the SPE has been started and is executing tasks; and the IDLE status denotes that the SPE has been started and is not executing tasks. The status of each SPE may be stored in cache or memory, and may be updated according to status changes of SPEs such that the latest SPE status is maintained.

When the library begins to be invoked, PPE 600 creates an operation system thread first, then the SPE agent creating module 603 instructs the SPE to create an SPE agent, which receives instructions from the PPE and determines the type of the instructions. Then PPE 600 waits for the acknowledgement from the SPE to confirm that the above operations have been done. After receiving the acknowledgement, PPE 600 checks the status of each SPE with the SPE status maintaining module 602. And the instruction sending module 604 determines whether the number of available SPEs for invoking the library is adequate. In the determination process, the instruction sending module 604 first determines the number of required SPEs for invoking the current library based on the current SPE status, and then determines the number of SPEs that are in IDLE status; if the number of SPEs that are in IDLE status are more than the number of required SPEs for invoking the current library, then the number of available SPEs for invoking the library is adequate. If the number of available SPEs for invoking the library is adequate, the instruction sending module 604 sends the task of invoking the library to selected SPEs. That is, the SPEs in IDLE status. There may be a plurality of current SPEs that are in IDLE status, and there may be many methods to select SPEs, for example, to select SPEs randomly, or according to an SPE sequence number, or any other methods known to those skilled in the art, etc. After selection, the instruction sending module 604 sends the run instruction to the selected SPEs, and then the SPE status maintaining module 602 updates the SPE status as BUSY status. When the PPE receives the result from an SPE, the SPE status maintaining module 602 updates the SPE status as IDLE status. Then the instruction sending module 604 determines whether there is a need to invoke the next library, if needed, the SPEs that are in NOT STARTED status will be started. If the number of available SPEs for invoking the library is not adequate, more SPEs need to be started. If all SPEs have been started, the process waits. If all the libraries have been invoked, the instruction sending module 604 sends a termination instruction to all SPEs started, and waits until the termination of all SPE threads. After all SPE threads are terminated, the instruction sending module 604 releases the resource of each SPE, and the PPE process ends.

There is a corresponding SPE process, in which SPE responses to the PPE request, initializes SPE environments and creates an SPE agent for capturing PPE instructions and determining the type of the instructions. Then, the SPE sends the acknowledgement that the SPE initialization process has ended. When the SPE agent begins to run, the SPE agent will capture the run instruction or termination instruction. In the existing technology, there is no such kind of agent, so the SPE termination is not controlled by the PPE, that is, after the SPE finishes its task, the SPE will be terminated and the PPE is notified automatically. In the illustrative embodiments, the objective to control SPEs by the PPE is obtained by creating such SPE agent in the SPEs. The SPE agent for capturing the instructions from the PPE executes the following steps: receiving an instruction from the PPE; determining whether the instruction is a termination instruction or a run instruction; if the instruction is a termination instruction, terminating the SPE; if the instruction is a run instruction, instructing the SPE to execute the instruction, that is to process the received data and send the result back in response to the PPE request.

A point should be made that the modules in the system of the illustrative embodiments may be implemented by hardware circuitry such as Very Large Scale Integrated Circuit or gate array, semiconductors such as logic chips and transistors, or programmable hardware devices such as field programmable gate array, programmable logic device, or by software executing on various types of processors, or by the combination of above hardware circuitry and software.

The present invention also provides a program product, which comprises the program code implementing the above methods and medium for storing the program code. The medium is a tangible computer readable storage medium having the program code, which may also be referred to as a computer readable program, recorded thereon.

Although the illustrative embodiments have been described herein with reference to the accompanying drawings, it is to be understood that the present invention is not limited to those precise embodiments, and that various other changes and modifications may be affected therein by one of ordinary skill in the related are without departing from the scope or spirit of the invention. All such changes and modifications are intended to be included within the scope of the invention as described by the appended claims.

The invention claimed is:

1. A method for invoking a multi-library application on a multiple processor system, wherein the multiple processor system comprises a First Processing Element (FPE) and a plurality of Other Processing Elements (OPEs) in a single chip the multi-library application including multiple libraries that run on the FPE, the method comprising:
   maintaining a status of each OPE of the plurality of OPEs, in the multi-library application running on the FPE, wherein there are OPE agents for capturing instructions from the FPE in each of the plurality of OPEs;
   in response to a request for invoking a first library in the multi-library application, determining, by the FPE, whether a number of available OPEs of the plurality of OPEs for invoking the first library is adequate based on a current status of each of the OPEs in the plurality of OPEs;
   responsive to the number of available OPEs being adequate, sending, by the FPE, a run instruction to selected OPEs;
   responsive to the number of available OPEs being inadequate, starting, by the FPE, one or more additional OPEs to address the inadequacy, wherein starting a given OPE in the one or more additional OPEs comprises:
      starting, by the FPE, the given OPE by creating an OPE thread;
      instructing, by the FPE, the given OPE to create an OPE agent for capturing instructions from the FPE; and
      sending, by the FPE, a run instruction to the given OPE; and
   after finishing an invocation of all libraries, sending, by the FPE, termination instructions to all of the selected OPEs.

2. The method as recited in claim 1, wherein the FPE is a Power Processing Element and each OPE is a Synergistic Processing Element and wherein the OPEs have a different instruction set from the FPE.

3. The method as recited in claim 1, wherein the status of the plurality of OPEs include BUSY, IDLE, and NOT STARTED, wherein the NOT STARTED status denotes that the OPE has not been started, wherein the BUSY status denotes that the OPE has been started and is executing tasks, and wherein the IDLE status denotes that the OPE has been started and is not executing tasks.

4. The method as recited in claim 3, wherein the step of the FPE determining whether the number of available OPEs of the plurality of OPEs for invoking the first library is adequate further comprises:
   determining a number of required OPEs for invoking the first library;
   determining the number of OPEs of the plurality of OPEs that are in IDLE status; and
   if the number of OPEs of the plurality of OPEs that are in IDLE status is more than the number of required OPE for invoking the first library, then determining that the number of available OPEs of the plurality of OPEs for invoking the first library is adequate.

5. The method as recited in claim 4, wherein after sending the run instruction to the given OPE that is in IDLE status, updating the given OPE status as BUSY status.

6. The method as recited in claim 3, wherein the OPEs are selected either randomly or according to an OPE sequence number.

7. The method as recited in claim 1, wherein the OPE agent for capturing the instructions from the FPE executes the following steps:
   receiving an instruction from the FPE;
   determining whether the instruction is a termination instruction or a run instruction;
   if the instruction is run instruction, instructing the OPE to execute the instruction and send the result back; and
   if the instruction is termination instruction, terminating the OPE.

8. A multiple-processor system for invoking a multi-library application on a multiple processor system, wherein the multiple processor system comprises a First Processing Element (FPE) and a plurality of Other Processing Elements (OPEs) in a single chip the multi-library application including multiple libraries that run on the FPE, the multiple-processor system comprising:
   a memory coupled to the FPE and the plurality of OPEs, wherein the memory comprises instructions which, when executed by the FPE, cause the FPE to:
   maintain, in the multi-library application running on the FPE, a status of each OPE of the plurality of OPEs, wherein there are OPE agents for capturing instructions from the FPE in each of the plurality of OPEs;
   in response to a request for invoking a first library in the multi-library application, determine whether a number of available OPEs of the plurality of OPEs for invoking the first library is adequate based on a current status of each of the OPEs in the plurality of OPEs;
   responsive to the number of available OPEs being adequate, send a run instruction to selected OPEs;
   responsive to the number of available OPEs being inadequate, start one or more additional OPEs to address the inadequacy, wherein the instructions to start a given OPE in the one or more additional OPEs further causes the FPE to:
      start the given OPE by creating an OPE thread;
      instruct the given OPE to create an OPE agent for capturing instructions from the FPE; and
      send a run instruction to the given OPE; and
   after finishing an invocation of all libraries, send termination instructions to all of the selected OPEs.

9. The multiple-processor system as recited in claim 8, wherein the FPE is a Power Processing Element and each OPE is a Synergistic Processing Element and wherein the OPEs have a different instruction set from the FPE.

10. The multiple-processor system as recited in claim 8, wherein the status of the plurality of OPEs include BUSY, IDLE, and NOT STARTED, wherein the NOT STARTED status denotes that the OPE has not been started, wherein the BUSY status denotes that the OPE has been started and is executing tasks, and wherein the IDLE status denotes that the OPE has been started and is not executing tasks.

11. The multiple-processor system as recited in claim 10, wherein the instructions to determine whether the number of available OPEs of the plurality of OPEs for invoking the first library is adequate further cause the FPE to:
 determine a number of required OPEs for invoking the first library;
 determine the number of OPEs of the plurality of OPEs that are in IDLE status; and
 if the number of OPEs of the plurality of OPEs that are in IDLE status is more than the number of required OPE for invoking the first library, then determine that the number of available OPEs of the plurality of OPEs for invoking the first library is adequate.

12. The multiple-processor system as recited in claim 10, wherein the OPEs are selected either randomly or according to an OPE sequence number.

13. The multiple-processor system as recited in claim 12, wherein the instructions further cause the FPE to:
 update the given OPE status as BUSY status after sending the run instruction to the given OPE that is in IDLE status.

14. A program product for invoking a multi-library application on a multiple processor system, wherein the multiple processor system comprises a First Processing Element (FPE) and a plurality of Other Processing Elements (OPEs) in a single chip the multi-library application including multiple libraries that run on the FPE, the program product comprising a non-transitory computer readable storage medium having a computer readable program recorded thereon, wherein the computer readable program, when executed on a computing device, causes the FPE of the computing device to:
 maintain, in the multi-library application running on the FPE, a status of each OPE of the plurality of OPEs, wherein there are OPE agents for capturing instructions from the FPE in each of the plurality of OPEs;
 in response to a request for invoking a first library in the multi-library application, determine whether a number of available OPEs of the plurality of OPEs for invoking the first library is adequate based on a current status of each of the OPEs in the plurality of OPEs;
 responsive to the number of available OPEs being adequate, send a run instruction to selected OPEs;
 responsive to the number of available OPEs being inadequate, start one or more additional OPEs to address the inadequacy, wherein the computer readable program to start a given OPE in the one or more additional OPEs further causes the FPE of the computing device to:
  start the given OPE by creating an OPE thread;
  instruct the given OPE to create an OPE agent for capturing instructions from the FPE; and
  send a run instruction to the given OPE; and
 after finishing an invocation of all libraries, send termination instructions to all of the selected OPEs.

15. The program product as recited in claim 14, wherein the FPE is a Power Processing Element and each OPE is a Synergistic Processing Element and wherein the OPEs have a different instruction set from the FPE.

16. The program product as recited in claim 14, wherein the status of the plurality of OPEs include BUSY, IDLE, and NOT STARTED, wherein the NOT STARTED status denotes that the OPE has not been started, wherein the BUSY status denotes that the OPE has been started and is executing tasks, and wherein the IDLE status denotes that the OPE has been started and is not executing tasks.

17. The program product as recited in claim 16, wherein the computer readable program to determine whether the number of available OPEs of the plurality of OPEs for invoking the first library is adequate further causes the FPE of the computing system to:
 determine a number of required OPEs for invoking the first library;
 determine the number of OPEs of the plurality of OPEs that are in IDLE status; and
 if the number of OPEs of the plurality of OPEs that are in IDLE status is more than the number of required OPE for invoking the first library, then determine that the number of available OPEs of the plurality of OPEs for invoking the first library is adequate.

18. The program product as recited in claim 16, wherein the OPEs are selected either randomly or according to an OPE sequence number.

19. The program product as recited in claim 18, wherein the computer readable program further causes the FPE of the computing system to:
 update the given OPE status as BUSY status after sending the run instruction to the given OPE that is in IDLE status.

* * * * *